United States Patent
Halper et al.

(10) Patent No.: US 8,458,082 B2
(45) Date of Patent: Jun. 4, 2013

(54) AUTOMATED LOAN RISK ASSESSMENT SYSTEM AND METHOD

(75) Inventors: Steven C. Halper, St. Charles, MO (US); Constance A. Wilson, Lake St. Louis, MO (US); Stephen M. Hourigan, Zionsville, IN (US)

(73) Assignee: Interthinx, Inc., Agoura Hills, CA (US)

( * ) Notice: Subject to any disclaimer, the term of this patent is extended or adjusted under 35 U.S.C. 154(b) by 1764 days.

(21) Appl. No.: 10/046,945

(22) Filed: Jan. 14, 2002

(65) Prior Publication Data

US 2003/0093366 A1    May 15, 2003

Related U.S. Application Data

(63) Continuation-in-part of application No. 09/993,072, filed on Nov. 13, 2001, now Pat. No. 7,689,503.

(51) Int. Cl.
*G06Q 40/00* (2012.01)

(52) U.S. Cl.
USPC .............................................. 705/38; 705/35

(58) Field of Classification Search
USPC .............................................. 705/40, 35–38
See application file for complete search history.

(56) References Cited

U.S. PATENT DOCUMENTS

| | | | |
|---|---|---|---|
| 4,578,768 A | 3/1986 | Racine | |
| 4,736,294 A * | 4/1988 | Gill et al. | 705/38 |
| 4,870,576 A | 9/1989 | Tornetta | |
| 4,878,125 A | 10/1989 | Katayama et al. | |
| 5,050,095 A | 9/1991 | Samad | |
| 5,129,038 A | 7/1992 | Kohda et al. | |
| 5,142,612 A | 8/1992 | Skeirik | |
| 5,167,009 A | 11/1992 | Skeirik | |
| 5,189,606 A | 2/1993 | Burns et al. | |
| 5,212,765 A | 5/1993 | Skeirik | |
| 5,214,746 A | 5/1993 | Fogel et al. | |
| 5,235,673 A | 8/1993 | Austvold et al. | |
| 5,251,131 A | 10/1993 | Masand et al. | |
| 5,253,331 A | 10/1993 | Lorenzen et al. | |
| 5,262,941 A | 11/1993 | Saladin et al. | |
| 5,268,835 A | 12/1993 | Miyagaki et al. | |
| 5,276,771 A | 1/1994 | Manukian et al. | |
| 5,297,237 A | 3/1994 | Masuoka et al. | |
| 5,305,214 A | 4/1994 | Komatsu | |

(Continued)

FOREIGN PATENT DOCUMENTS

| JP | 5053887 | 3/1993 |
|---|---|---|
| JP | 6068096 | 3/1994 |

OTHER PUBLICATIONS

Office Action dated Mar. 17, 2009, from co-pending U.S. Appl. No. 09/993,072 (11 pages).

(Continued)

*Primary Examiner* — Gregory Johnson
(74) *Attorney, Agent, or Firm* — McCarter & English, LLP

(57) ABSTRACT

An automated loan risk assessment system and method are described. The system is adapted to receive information about a loan or an insurance application requesting insurance to cover same. The system calculates a risk score for the loan based on a plurality of risk factors including at least two of a fraud risk factor, a credit risk factor and a property valuation risk factor. The risk score can be used by a loan service provider in deciding whether or not to fund or insure the loan.

52 Claims, 5 Drawing Sheets

U.S. PATENT DOCUMENTS

| | | | |
|---|---|---|---|
| 5,313,204 A | 5/1994 | Semasa et al. | |
| 5,331,544 A | 7/1994 | Lu et al. | |
| 5,339,257 A | 8/1994 | Layden et al. | |
| 5,347,446 A | 9/1994 | Iino et al. | |
| 5,353,207 A | 10/1994 | Keeler et al. | |
| 5,361,201 A | 11/1994 | Jost et al. | |
| 5,377,095 A | 12/1994 | Maeda et al. | |
| 5,398,300 A | 3/1995 | Levey | |
| 5,402,333 A | 3/1995 | Cardner | |
| 5,414,621 A | 5/1995 | Hough | |
| 5,480,586 A | 1/1996 | Jakubicki et al. | |
| 5,481,647 A * | 1/1996 | Brody et al. | 706/11 |
| 5,528,730 A | 6/1996 | Yagi et al. | |
| 5,634,087 A | 5/1997 | Mammone et al. | |
| 5,640,493 A | 6/1997 | Skerik | |
| 5,673,402 A * | 9/1997 | Ryan et al. | 705/38 |
| 5,680,305 A | 10/1997 | Apgar, IV | |
| 5,712,985 A | 1/1998 | Lee et al. | |
| 5,740,033 A | 4/1998 | Wassick et al. | |
| 5,774,633 A | 6/1998 | Baba et al. | |
| 5,819,226 A | 10/1998 | Gopinathan et al. | |
| 5,862,304 A | 1/1999 | Ravdin et al. | |
| 5,870,721 A * | 2/1999 | Norris | 705/38 |
| 5,878,403 A * | 3/1999 | DeFrancesco et al. | 705/38 |
| 5,966,700 A * | 10/1999 | Gould et al. | 705/38 |
| 6,006,242 A | 12/1999 | Poole et al. | 707/531 |
| 6,021,397 A * | 2/2000 | Jones et al. | 705/36 R |
| 6,029,149 A * | 2/2000 | Dykstra et al. | 705/38 |
| 6,088,686 A | 7/2000 | Walker et al. | 705/38 |
| 6,105,007 A * | 8/2000 | Norris | 705/38 |
| 6,112,190 A * | 8/2000 | Fletcher et al. | 705/36 R |
| 6,119,103 A | 9/2000 | Basch et al. | 705/35 |
| 6,185,543 B1 * | 2/2001 | Galperin et al. | 705/38 |
| 6,233,566 B1 * | 5/2001 | Levine et al. | 705/36 R |
| 6,249,775 B1 * | 6/2001 | Freeman et al. | 705/36 R |
| 6,330,546 B1 | 12/2001 | Gopinathan et al. | 705/35 |
| 6,385,594 B1 * | 5/2002 | Lebda et al. | 705/38 |
| 6,587,841 B1 * | 7/2003 | DeFrancesco et al. | 705/38 |
| 6,597,775 B2 | 7/2003 | Lawyer et al. | |
| 6,820,069 B1 | 11/2004 | Kogan et al. | 706/46 |
| 6,839,682 B1 | 1/2005 | Blume et al. | |
| 6,985,886 B1 * | 1/2006 | Broadbent et al. | 705/38 |
| 6,993,505 B1 * | 1/2006 | Katz et al. | 705/38 |
| 7,392,216 B1 * | 6/2008 | Palmgren et al. | 705/37 |
| 7,395,239 B1 * | 7/2008 | Riseman | 705/38 |
| 7,406,442 B1 * | 7/2008 | Kottmeier et al. | 705/35 |
| 7,412,417 B1 | 8/2008 | Tuttle | |
| 7,599,879 B2 * | 10/2009 | Louie et al. | 705/37 |
| 7,680,728 B2 * | 3/2010 | Lazerson | 705/38 |
| 7,742,966 B2 * | 6/2010 | Erlanger | 705/37 |
| 7,818,254 B1 * | 10/2010 | Ma | 705/50 |
| 7,873,556 B1 * | 1/2011 | Dolan et al. | 705/36 R |
| 8,015,091 B1 * | 9/2011 | Ellis | 705/36 T |
| 2001/0029482 A1 * | 10/2001 | Tealdi et al. | 705/38 |
| 2001/0037274 A1 * | 11/2001 | Monticciolo | 705/35 |
| 2001/0042785 A1 * | 11/2001 | Walker et al. | 235/379 |
| 2001/0047326 A1 * | 11/2001 | Broadbent et al. | 705/38 |
| 2002/0019804 A1 * | 2/2002 | Sutton | 705/38 |
| 2002/0040339 A1 * | 4/2002 | Dhar et al. | 705/38 |
| 2002/0052835 A1 * | 5/2002 | Toscano | 705/38 |
| 2002/0099650 A1 * | 7/2002 | Cole | 705/38 |
| 2002/0103750 A1 * | 8/2002 | Herzfeld | 705/38 |
| 2002/0116323 A1 * | 8/2002 | Schnall | 705/38 |
| 2002/0116327 A1 * | 8/2002 | Srinivasan | 705/38 |
| 2002/0198822 A1 * | 12/2002 | Munoz et al. | 705/38 |
| 2003/0050879 A1 * | 3/2003 | Rosen et al. | 705/35 |
| 2003/0093346 A1 * | 5/2003 | Weber | 705/35 |
| 2003/0093365 A1 * | 5/2003 | Halper et al. | 705/38 |
| 2003/0093366 A1 * | 5/2003 | Halper et al. | 705/38 |
| 2003/0229581 A1 | 12/2003 | Green et al. | 705/38 |
| 2004/0054619 A1 * | 3/2004 | Watson et al. | 705/38 |
| 2004/0117302 A1 * | 6/2004 | Weichert et al. | 705/40 |
| 2007/0043654 A1 * | 2/2007 | Libman | 705/38 |
| 2011/0106693 A1 * | 5/2011 | Halper et al. | 705/38 |

OTHER PUBLICATIONS

Interview Summary dated Jul. 13, 2009, from co-pending U.S. Appl. No. 09/993,072 (3 pages).

Notice of Allowance dated Dec. 15, 2009, from co-pending U.S. Appl. No. 09/993,072 (7 pages).

Office Action dated Mar. 30, 2011, from pending U.S. Appl. No. 12/913,305 (7 pages).

Abraham, et al., "New evidence on home prices from Freddie-Mac repeat sales," AREUEA Journal, vol. 19, No. 3, pp. 333-352 (1991).

Bailey, et al., "A Regression Method for Real Estate Price Index Construction," Journal of the American Statistical Association vol. 58, pp. 933-942 (1963).

Bandyopadhyay, et al., "An Algorithm for Setting the List Price of a Residential Real Estate Property," Interfaces, vol. 11, No. 4, pp. 55-61 (1981).

Berry, et al., "A Hedonic Model for Prices and Assessments for Single-Family Homes: Does the Assessor Follow the Market or the Market Follow the Assessor," Land Economics, vol. 51, issue 1, pp. 21-40 (1975).

Born, "A Real Estate Market Research Method to Screen Areas for New Construction Potential," Journal of Real Estate Research, vol. 3, No. 3, pp. 51-62 (1988).

Borst, "Artificial Neural Networks: The Next Modeling/Calibration Technology for the Assessment Community?" Property Tax Journal, vol. 10, No. 1, pp. 69-94 (Mar. 1991).

Boyle, "An Expert System for Valuation of Residential Properties," (1984).

Buntine, et al., "Bayesian Back-Propagation," Complex Systems, vol. 5, pp. 603-643 (1991).

Can, "Specification and Estimation of Hedonic Housing Price Models," Regional Science and Urban Economics, 22, pp. 453-474 (1992).

Carbone, et al., "A Feedback Model for Automated Real Estate Assessment," Management Science, vol. 24, No. 3, pp. 241-248 (Nov. 1977).

Case, et al., "Forecasting Prices and Excess Returns in the Housing Market," AREUEA Journal, vol. 18, No. 3, pp. 253-273 (1990).

Case, et al., "The Dynamics of Real Estate Prices," The Review of Economics and Statistics, vol. 73, No. 1, pp. 50-58 (Feb. 1991).

Chapin, "A Model for Simulating Residential Development," Journal of the American Planning Association, vol. 31, Issue 2, pp. 120-125 (1965).

Cho, "House Price Dynamics: A Survey of Theoretical and Empirical Issues," Journal of Housing Research, vol. 7, Issue 2, pp. 145-172 (1996).

Cronan, et al., "The Use of Rank Transformation and Multiple Regression Analysis in Estimating Residential Property Values With a Small Sample," The Journal of Real Estate Research, vol. 1, No. 1 (1986).

Crone, et al., "Estimating House Price Appreciation: A Comparison of Methods," Journal of Housing Economics, vol. 2, pp. 324-338 (1992).

Cutler, et al., "Speculative Dynamics," Review of Economic Studies, vol. 58, pp. 529-546 (1991).

Damm, et al., "The Response of Urban Real Estate Values in Anticipation of The Washington Metro," Journal of Transport Economics and Policy, Sep., pp. 315-336 (1980).

Des Rosiers, et al., "Integrating Geographic Information Systems to Hedonic Price Modeling: An Application to the Quebec Region," Property Tax Journal, vol. 11, No. 1, pp. 29-58 (Mar. 1992).

Dixon, et al., "Use of Two-Limit Probit Regression Model: An Analysis of Lender Response to Loan Requests," Journal of Business Research, vol. 10, pp. 489-502 (Dec. 1982).

Do, et al., "A Neural Network Approach to Residential Property Appraisal," Real Estate Appraiser, vol. 58, Issue 3, pp. 38-45 (1992).

Dotzour, "Quantifying Estimation Bias in Residential Appraisal," Journal of Real Estate Research, vol. 3, No. 3, pp. 1-11 (1988).

Eakin, et al., "Optimal Cost Sampling for Decision Making with Multiple Regression Models," Decision Sciences, vol. 20, Issue 1, pp. 14-26 (Mar. 1989).

Goetzmann, "The Accuracy of Real Estate Indices: Repeat Sales Estimators," Journal of Real Estate Finance and Economics 5(1), pp. 5-54 (1992).

Gonzalez, et al., "A Case-Based Reasoning Approach to Real Estate Property Appraisal," Expert Systems With Applications, vol. 4, pp. 229-246 (1992).

Hecht-Nielsen, "Theory of the Backpropagation Neural Network," Neural Networks for Perception, pp. 65-93 (1992).

Jensen, "Artificial Intelligence in Computer-Assisted Mass Appraisal," Property Tax Journal, vol. 9, No. 1, pp. 5-24 (Mar. 1990).

Kang, et al., "An Empirical Analysis of Hedonic Regression and Grid-Adjustment Techniques in Real Estate Appraisal," AREUEA, vol. 19, Issue 1, pp. 70-91 (Mar. 1991).

Kershaw, et al., "Micro-Computer Based Real Estate Decision Making and Information Management—an Integrated Approach," University of South Australia (Jan. 1991).

Lu, et al., "Neurocomputing Approach to Residential Property Valuation," Journal of Microcomputer Systems Management, vol. 4, No. 2, pp. 21-30 (1992).

Makridakis, et al., "The Accuracy of Extrapolation (Time Series) Methods: Results of a Forecasting Competition" Journal of Forecasting, vol. 1, pp. 111-153 (1982).

Melchert, et al., "Central City Revitalization: A Predictive Model," AREUEA Journal, vol. 15, No. 1, pp. 664-683 (1987).

Miller, et al., "Multiple Regression Condominium Valuation With a Touch of Behavioral Theory," The Appraisal Journal (Jan. 1987).

Miller, et al., "Pricing Strategies and Residential Property Selling Prices," The Journal of Real Estate Research, vol. 2, No. 1, pp. 31-40 (1987).

Norman, Miller G, "Residential Property Hedonic Pricing Models," Research in Real Estate, pp. 31-56 (1982).

Ricketts, et al, "Corporate Operating Income Forecasting Ability," Financial Management ,vol. 2, No. 2 (Summer, 1973).

Ridker, et al., "The Determinants of Residential Property Values with Special Reference to Air Pollution," Rev. Econ. Stat., vol. 49, No. 2, pp. 246-257 (May 1967).

Robert M.J. Czernkowski, "Expert Systems in Real Estate Valuation", Journal of Property Valuation and Investment, vol. 8, issue 4, pp. 376-393 (1990).

Rumelhart et al., "Learning Representations by Back-Propagating Errors," Nature vol. 323, pp. 533-536 (1986).

Sauter, B. W., "Valuation Stability: A Practical Look at the Problems," Property Tax Journal, vol. 6, No. 4, pp. 243-250 (Dec. 1987).

Shilling, et al., "Estimating Net Realizable Value for Distressed Real Estate," Journal of Real Estate Research, vol. 5, No. 1, pp. 129-140 (1990).

Shonkwiler, et al., "A Note on the Use of Hedonic Price Models in the Analysis of Land Prices at the Urban Fringe," Land Economics, vol. 62, No. 1 (Feb. 1986).

Tadi, et al., "Error Analysis: a Tool for Selecting Travel Demand Models," Mathl Comput. Modelling, vol. 12, No. 12, pp. 1465-1471 (1989).

Tay, et al., "Artificial Intelligence and the Mass Appraisal of Residential Apartments," Journal of Property Valuation & Investment: 10, pp. 525-540 (1992).

Thibodeau, et al, "Using Multiple Regression Analysis to Determine the Accuracy of Mass Appraisals," Property of Tax Journal, vol. 6, No. 2 (1987).

Utans, et al., "Selecting Neural Network Architectures via the Prediction Risk: Application to Corporate Bond Rating Prediction," Conference Proceedings on the First International Conference on Artificial Intelligence Applications on Wall Street (1991).

Ward, et al., "A Comparison of Feedback and Multivariate Nonlinear Regression Analysis in Computer-Assisted Mass Appraisal," Property Tax Journal, vol. 7, No. 2, pp. 43-67 (1988).

Wood, "Combining Forecasts to Predict Property Values for Single-Family Residences," Land Economics, vol. 52, No. 2, pp. 221-229 (1976).

Eckert, Ph.D., "Property Appraisal and Assessment Administration," The International Association of Assessing Officers, pp. 302-398 (1990).

Almy et al., "Improving Real Property Assessment: A Reference Manual," The International Association of Assessing Officers, Chapters 5, 7 (1978).

German, "How a MRA Model Can Contain More Than Fifty Terms Successfully and Provide Consistent Decomposition of Value," World Congress on Computer Assisted Valuation, Th. 15, Paper No. 8 (Aug. 1982).

Jensen, "Alternative Modeling Techniques in Computer-Assisted Mass Appraisal," Property Tax Journal, pp. 193-237 (1984).

Jensen, "The Application of Bayesian Regression for a Valuation Model Update in Computer-Assisted Mass Appraisal," Property Tax Journal, pp. 271-283 (1985).

Office Action dated Jan. 4, 2012, from pending U.S. Appl. No. 12/913,305 (16 pages).

Office Action dated Jun. 19, 2012, from pending U.S. Appl. No. 12/913,305 (21 pages).

"Electionic Loan Review" by Affinity Corporation, web page located at http://www.teamaffinity.com/content/lenders/elr.asp.

"FraudGuard.com" by Affinity Corporation, web page located at http://www.fraudguard.com/default.asp.

"Safecheck" by Affinity Corporation, web page located at http://www.teamaffinity.com/content/lenders/safecheck.asp.

"Bankruptcy Search" by Affinity Corporation, web page located at http://www.teamaffinity.com/content/lenders/bankruptcy_search.asp.

"Address Validation" by Affinity Corporation, web page located at http://www.teamaffinity.com/content/lenders/address_validation.asp.

"National Phone Directory" by Affinity Corporation, web page located at http://www.teamaffinity.com/content/lenders/national_phone_dir.asp.

"Pre-Funding Comprehensive Screening Audit" by Affinity Corporation, web page located at http://www.teamaffinity.com/content/lenders/screening.asp.

"Directed Audit Services" by Affinity Corporation, web page located at http://www.teamaffinity.com/content/lenders/audit_services.asp.

"Asset Search" by Affinity Corporation, web page located at http://www.teamaffinity.com/content/lenders/asset_search.asp.

"Fraud Guard" brochure by Affinity Corporation (4 pages).

Emory University School of Law, "Predatory Mortgage Lending Abuses," http://www.law.emory.edu/PI/ALAS/EXHIB.HTM, last visited on Sep. 27, 2001, pp. 1-6.

American Association of Retired Perspons, "Avoid Predatory Lenders," http://www.aarp.org/confacts/money/prelend.html, last visited on Sep. 27, 2001, pp. 1-4.

Federal Trade Commission, "FTC Consumer Alert! Avoiding Home Equity Scams," http://www.ftc.gov/bcp/conline/pubs/alerts/eqtyalrt.htm, last visited on Sep. 27, 2001, pp. 1-2.

National Consumer Law Center, "Preventing Foreclosures: Spotting Loan Scams Involving Vulnerable Homeowners," http://www.consumerlaw.org/consumer/foreclose.html, last visited on Sep. 27, 2001, pp. 1-5.

Citibank, "Tell Citibank What is Predatory Lending?," http://www.tellcitibank.org/predatorylending.htm, last visited on Sep. 27, 2001, pp. 1-2.

Center for Community Change, "Anti-Predatory Lending Bill Set to be Introduced in Senate; Additional Co-Sponsors Are Being Sought," http://www.communitychange.org/NRP/52101alert.asp, last visited on Sep. 28, 2001, pp. 1-2.

Mortgage Bankers Association, "Tackling Predatory Lending: Regulation and Education," Cleveland State University, Cleveland, Ohio, Mar. 23, 2001; http://www.mbaa.org/resources/predlend/2001/0323.html, last visited on Oct. 12, 2001, pp. 1-4.

California Reinvestment Committee, "Press Releases," http://www.calreinvest.org/PredatoryLending/HOEPAFactSheet.html, Feb. 7, 2001, last visited on Oct. 12, 2001, pp. 1-4.

HSH, "Understanding Private Mortgage Insurance," http://www.hsh.com/pamphlets/mgicpmi.html, last visited on Oct. 24, 2001, pp. 1-2.

HSH, "How Mortgage Insurance Works," http://www.hsh.com/pamphlets/mgicmi101.html, last visited on Oct. 24, 2001, pp. 1-2.

Loanpage, "Private Mortgage Insurance," http://www.loanpage.com/morpmi.htm, last visited on Oct. 24, 2001, pp. 1-2.

"Automated Property Valuation Sample Report," http://www.factualdata.com/prod_serv/EZvalue.htm, Nov. 30, 2001, pp. 1-3.

DataQuick, "News & Updates: DataQuick to Offer All-New Freddie Mac Automated Valuation Model," http://www.dataquick.com/articleitem.asp?industry=3&item=20, last visited on Nov. 30, 2001, pp. 1-2.

Case Shiller Weiss, "Press Releases," http://www.cswv.com/news/press, last visited on Nov. 30, 2001, pp. 1-2.

Case Shiller Weiss, "Products," http://www.cswv.com/products/, last visited on Nov. 30, 2001, pp. 1-2.

Case Shiller Weiss, "CASA," http://www.cswv.com/products/casa/, last visited on Nov. 30, 2001, pp. 1-2.

Case Shiller Weiss, "Sample CASA Report," http://www.cswv.com/products/casa/sample.html, last visited on Nov. 30, 2001, pp. 1-2.

Case Shiller Weiss, "CASA Report Elements and Features," http://www.cswv.com/products/casa/personal.html, last visited on Nov. 30, 2001, pp. 1-3.

Office Action dated Jul. 13, 2006, from co-pending U.S. Appl. No. 09/993,072.

Office Action dated Jan. 16, 2007, from co-pending U.S. Appl. No. 09/993,072.

Office Action dated May 22, 2007, from co-pending U.S. Appl. No. 09/993,072.

Office Action dated Nov. 1, 2007, from co-pending U.S. Appl. No. 09/993,072.

Nissenbaum, Dion, "State sells birth data to Web site, raising ID theft fears", Mercury News Sacramento Bureau webpage printout from http://www.siliconvalley.com/docs/news/depth/037140.htm (Nov. 28, 2001), 3 pages.

E-mail communication from AROBERTSON@TEAMAFFINITY.COM, dated Dec. 3, 2001, Subject: Setting the Standard for Excellence, 3 pages.

Office Action dated Jun. 30, 2008, from co-pending U.S. Appl. No. 09/993,072.

AppIntelligence, Inc. Press Release dated May 25, 2000 (1 page).

AppIntelligence, Inc., "Appintell To Provide Fraud Prevention Software to Household Financial Services," Press Release dated Sep. 7, 2000 (1 page).

AppIntelligence, Inc. Press Release dated Jan. 12, 2001 (1 page).

AppIntelligence, Inc. Press Release dated Aug. 7, 2001 (4 pages).

AppIntelligence, Inc., "Fraud Prevention Now Provided Through REALtrans," Press Release dated Jul. 13, 2001 (4 pages).

* cited by examiner

FIGURE 3

Fraud Filter for Mortgage Insurance (3.0)

DISSCLOSE CONFIRMATION PAGE

DATE: 05/04/2000 6:10:32 PM
DISSCO ID: DISSCO20002013123   LOAN NUMBER: 123456789
BORROWER: JOHN MOUSE       Number of times loan was successfully scored: 3

| INSURFILTER STATUS: | INVESTIGATE | INSURFILTER SCORE: | 320 |
|---|---|---|---|

| | Transgression | Description | * | Action to Resolve | * | |
|---|---|---|---|---|---|---|
| 1. | Property value exceeds expected range | Possible flip | ☐ | Desktop review of the appraisal | ☐ | ✔ |
| 2. | Effective date on MI does not reflect Loan closing date | Possible loan amount misrep. | ☐ | Verify Closing Documents | ☐ | ✔ |

LEGEND:
* - RESOLVED: Checked indicates satisfaction of condition and supporting documentation to be attached.
☐ - COMMENT FIELD
   ✔ - Comment Available (Click to EDIT/VIEW a Comment).
   ✔ - No Comments (Click to ADD a Comment).

Description From Loan Application

LOAN NUMBER: 123456789
LOAN AMOUNT: $102,403.00        ESTIMATED/APPRAISED VALUE: $102,500.00
PURCHASE PRICE: $102,403.00     SUBORDINATE FINANCING:
PURPOSE: PURCHASE               PROPERTY TYPE: SINGLE FAMILY
OCCUPANCY: OWNER OCCUPIED       APPLICATION DATE: 05/03/2000
LTV: 100.00%                    CLTV: 0.00%

Mortgage Insurance Application

| Policy Number | Property Address | Loan Amount | Monthly Premium | Premium Amount |
|---|---|---|---|---|
| 13494-0002-6 | | | | |

| Effective Date | First Payment Date | Premium Due Date | Occupancy | LTV |
|---|---|---|---|---|
| | | | | |

FIGURE 5

AUTOMATED LOAN RISK ASSESSMENT SYSTEM AND METHOD

CROSS REFERENCE TO RELATED APPLICATION

This is a continuation-in-part of application Ser. No. 09/993,072 entitled Predatory Lending Detection System and Method Therefor filed Nov. 13, 2001 now U.S. Pat. No. 7,689,503.

FIELD OF THE INVENTION

This invention relates to an automated loan risk assessment system and method and in particular, an automated system and method of assessing risk with respect to a loan based on a plurality of risk factors including at least two of a fraud risk factor, an underwriting risk factor and a property valuation risk factor.

BACKGROUND OF THE INVENTION

One of the American dreams is home ownership. However, according to the Mortgage Guaranty Insurance Company, "[r]elative to the growth in home prices over the last century, Americans are earning less and, as a result, saving less." As a result, the down payment required to secure a mortgage often prevents young individuals just "starting out" from buying a home. Consequently, home mortgages having low down payments have become very popular. The less money a borrower has invested in a home, however, the greater the risk of default. Therefore, while there is some risk that a borrower may default with a conventional mortgage which typically requires a twenty percent (20%) down payment, this risk is increased for borrowers who are only putting down five percent (5%) or ten percent (10%). Low down payment mortgages, therefore, often require that the borrower obtain some type of mortgage insurance to protect the lender against loss if the borrower defaults on the mortgage. However, even with such protection, the lender typically is not able to recoup the entire amount of the mortgage.

Lenders and mortgage insurers try to minimize their exposure by obtaining information on borrowers indicative of their risk of defaulting on a mortgage, such as through credit reports or mortgage service systems such as The Mortgage Office, MORESERV and TRAKKER. There are also several existing consumer and mortgage scoring systems which generate underwriting scores to assist mortgage insurers in this regard, such as for example, the Fair Issac Consumer (FICO) score, the Private Mortgage Insurance (PMI) aura score, the United Guaranty ACUscore, and the ARCS subprime mortgage score.

None of these scoring tools, however, assess risk attributable to fraud (i.e., data integrity). For example, a lender may manipulate the loan information to qualify an otherwise unqualified borrower, or a borrower may falsify income or employment information in order to obtain the loan. To the extent fraudulent claims are not detected, the costs associated with paying them are ultimately borne by the consumer. According to a Sep. 26, 2001 article in Realty Times, reports of possible fraudulent activity in connection with a mortgage increased fifty-seven percent (57%) in the first quarter of this year.

Fraud can originate from numerous sources, such as lenders, borrowers, appraisers, title agents, real estate agents and builders. Fraud can be injected into the loan process in a number of ways, such as through the use of false credit histories, false income/employment information, falsified appraisals, inflated property values and false identification. For example, loan officers might fabricate pay stubs to help a borrower qualify for a loan that the borrower might not otherwise qualify for so that he or she can collect a commission. Likewise, a borrower might submit falsified tax returns to ensure he or she qualifies for the loan.

The potential for fraud increases as the number of parties involved in the transaction increases. Increases in mortgage fraud are also due to a number of other factors, such as (1) the creation of new and creative forms of financing, coupled with automated underwriting, (2) the increased availability of personal information via the Internet, and (3) the low-cost of computer equipment such as printers and copiers that produce high quality copies such that one can fabricate authentic-looking documents (i.e., pay stubs, tax returns).

Not only do fraudulent loans result in enormous financial losses, misrepresenting information on a loan application is illegal. Moreover, penalties for fraudulent lending violations include substantial monetary penalties such as repayment of twice the amount of all interest, fees, discounts and charges as well as court and attorney fees to the borrower. In addition, such violations can result in the temporary or permanent suspension of business privileges of the lender, such as the ability to sell to quasi-governmental agencies (e.g., Freddie Mac and Fannie Mae) or in secondary markets, or the ability to sell certain types of loans. In some cases, lenders can lose their licenses and face imprisonment. In the secondary market, purchasers and assignees can be held liable for all claims on loans in their possession. These costs are then often passed on to consumers in the form of higher loan costs, higher lending fees and higher interest rates.

Yet another risk associated with funding or insuring a loan relates to the accuracy of the valuation of the subject property. One of the most common problems associated with property valuations is known as property flipping. This practice involves a property that is bought and then resold (i.e., flipped) several times, each time at a falsely inflated price. The property is then sold to an unsuspecting mortgage company that pays much more for the property than its market value that can result in a substantial loss to the mortgage lender upon the reselling of the property. Typically, lenders use internal or third party property valuation models or tools such as AppIntell, Inc.'s ValVerify, Case Shiller Weiss' CASA, Solimar's Basis100 or First American's product suite which includes Value Point, Home Price Index, Assessed Value Model, AREA's, and Value Point Plus to analyze the value of the property provided in the loan documents and score it based on its accuracy. Such an analysis looks at factors like the value of other properties around the location of the subject property and the selling prices of comparable properties. This score is usually in the form of a value or grade representing a confidence level, which corresponds to a range of predicated value. For example, in the case of CASA, Grade A refers to a predicted value range within 6%, Grade B refers to a predicted value range between 6% and 8%, Grade C refers to a predicted value range of between 8% and 10%, Grade D refers to a predicted value range between 10% and 14%, and Grade E refers to a predicted value range between 14% and 20%. The bigger the discrepancy between the property value provided in the loan documents and the property value determined by such models or tools, the greater the risk in funding or insuring the loan.

Currently, fraud, underwriting and property valuation scoring systems originate from different sources. As a result, they are not compatible with each other. In other words, mortgage service providers must go to one company to have a risk assessment of the loan from an underwriting perspective, a different company to have a risk assessment of the loan from a fraud perspective, and possibly yet a different company to have a risk assessment of the loan from a property valuation perspective. This cumbersome process not only significantly delays the underwriting process, but also increases its costs tremendously. In fact, the single largest insurance policy acquisition cost in mortgage insurance is contract underwriting. Approximately half of loan public filings by private mortgage insurers in 2000 were referred to underwriters for manual review after the loan was scored vis-à-vis the borrower's credit history. Moreover, since the scores are not compatible, they cannot be combined into an overall score reflecting the level of risk of funding or insuring a loan based on at least two of the three scores. The potential cost and time savings as well as value of an automatic risk assessment system that takes into account risk from at least two of a fraud, underwriting and property valuation perspective all provided from one source is enormous.

There is, therefore, a need for an automated system and method that assesses the risk associated with funding or insuring a loan based on a plurality of risk factors.

BRIEF SUMMARY OF THE INVENTION

It is in view of the above problems that the present invention was developed. In particular, an automated loan risk assessment system is disclosed which comprises a mechanism for receiving information about a loan, and a mechanism for calculating a risk score for the loan based on a plurality of risk factors including at least two of a fraud risk factor, an underwriting risk factor and a property valuation risk factor, whereby the risk score can be used by a loan service provider in deciding whether or not to fund or insure the loan. In one embodiment, the risk score is based on a combination of the fraud risk score factor, the underwriting risk factor and the property valuation risk factor.

The risk calculation mechanism may further comprise a mechanism for calculating a fraud risk score, a mechanism for calculating an underwriting risk score, and a mechanism for calculating a property valuation score, wherein the risk score for the loan is based on at least two of the fraud risk score, the underwriting risk score and the property valuation risk score. The fraud risk score calculation mechanism comprises a mechanism for storing general information about borrowers and properties, and a mechanism for detecting one or more variances among the loan information or between the loan information and the general information, each variance having a certain degree, such that the fraud risk score is based on the detected variances and the degrees thereof. The system may further comprise a mechanism for determining one or more steps needed to resolve the one or more detected variances, a mechanism for tracking the status of the one or more detected variances, and/or a mechanism for assigning a risk category to the loan based on the risk score.

The underwriting risk score calculation mechanism comprises means for obtaining the underwriting risk score from an underwriting risk score provider, the property valuation risk score calculation mechanism comprises means for obtaining a property valuation risk score from a property valuation score provider. The system further comprises a mechanism for converting at least one of the fraud risk score, the underwriting risk score and the property valuation risk score. In one embodiment, the converting mechanism comprises a mechanism for weighting at least one of the fraud risk score, the underwriting risk score and the property valuation risk score based on the level of risk associated therewith such that the risk score is based on the weights assigned thereto. In another embodiment, the mechanism for converting comprises a mechanism for converting at least one of the fraud risk score, the underwriting risk score and the property valuation risk score such that all of the scores are compatible, and wherein the risk score represents an average of the compatible scores.

The loan information may include insurance information related to at least one insurance claim being asserted against an insurance policy to which a loan is subject, such that the mechanism for calculating a risk score comprises a mechanism for calculating a risk score for the claim based on a plurality of risk factors including at least one of a fraud risk factor, an underwriting risk factor and a property valuation risk factor, whereby the risk score can be used by a loan service provider in deciding whether to allow or deny the claim.

The system may further comprise a mechanism for interfacing at least one pricing scheme of a loan service provider such that a loan or an insurance policy for a loan can be automatically priced based on the risk score calculated therefor.

The present invention also discloses a computer-readable medium whose contents cause a computer system to assess the risk associated with funding or insuring a loan by performing the steps of receiving information about a loan, and calculating a risk score for the loan based on a plurality of risk factors including at least two of a fraud risk factor, a credit risk factor and a property valuation risk factor. The step of calculating the risk score further comprises the steps of calculating a fraud risk score, calculating an underwriting risk score, and calculating a property valuation score, wherein the risk score for the loan is based on the fraud risk score, the underwriting risk score and the property valuation risk score. In one embodiment, the risk score is based on a combination of the fraud risk score, the underwriting risk score and the property valuation risk score.

The step of calculating the fraud risk score may comprise storing general information about borrowers and properties, and detecting one or more variances among the loan information or between the loan information and the general information, each variance having a certain degree, such that the fraud risk score is based on the detected variances and the degrees thereof. In one embodiment, the medium includes the step of calculating a variance score for each detected variance based on the degree thereof, wherein the fraud risk score represents the sum of the variance scores. The medium may further include the steps of determining one or more steps needed to resolve the one or more detected variances, tracking the status of the one or more detected variances, and/or assigning a risk category to the loan based on the risk score.

The step of calculating the underwriting risk score may comprise obtaining the underwriting risk score from an underwriting risk score provider, and the step of calculating the property valuation risk score may comprise obtaining a property valuation risk score from a property valuation score provider. The medium may further comprise the step of converting at least one of the fraud risk score, the underwriting risk score and the property valuation risk score. In one embodiment, the step of converting comprises weighting at least one of the fraud risk score, the underwriting risk score and the property valuation risk score based on the level or risk associated therewith such that the risk score is based on the weights assigned thereto. In another embodiment, the step of converting comprises converting at least one of the fraud risk score, the underwriting risk score and the property valuation risk score such that all of the scores are compatible, and averaging the compatible scores.

The loan information includes insurance information related to at least one insurance claim being asserted against an insurance policy to which a loan is subject, such that the medium further comprises the step of calculating a risk score for the claim based on a plurality of risk factors including at least one of a fraud risk factor, an underwriting risk factor and a property valuation risk factor, whereby the risk score can be used by a loan service provider in deciding whether to allow or deny the claim.

The medium may further comprise the step of interfacing at least one pricing scheme of a loan service provider such that a loan or an insurance policy can be automatically priced based on the risk score calculated therefor.

The present invention also discloses a computer-implemented method of assessing the risk associated with the funding or insuring of a loan. The method comprises receiving information about a loan, and calculating a risk score for the loan based on a plurality of risk factors including at least two of a fraud risk factor, an underwriting risk factor and a property valuation risk factor. The step of calculating the risk score comprises the steps of calculating a fraud risk score, calculating an underwriting risk score, and calculating a property valuation score, wherein the risk score for the loan is based on the fraud risk score, the underwriting risk score and the property valuation risk score. In one embodiment, the risk score is based on a combination of the fraud risk score, the underwriting risk score, and the property valuation risk score. The step of calculating the fraud risk score comprises storing general information about borrowers and properties, and detecting one or more variances among the loan information or between the loan information and the general information, each variance having a certain degree, such that the fraud risk score is based on the detected variances and the degrees thereof. In one embodiment, the method further comprises the step of calculating a variance score for each detected variance based on the degree thereof, wherein the fraud risk score represents the sum of the variance scores. The method may further comprise the steps of determining one or more steps needed to resolve the one or more detected variances, tracking the status of the one or more detected variances, and/or assigning a risk category to the loan based on the risk score.

The step of calculating the underwriting risk score comprises obtaining a credit risk score from a credit risk score provider, and the step of calculating the property valuation risk score comprises obtaining a property valuation risk score from a property valuation score provider. The method may further comprise the step of converting at least one of the fraud risk score, the underwriting risk score and the property valuation risk score. In one embodiment, the step of converting comprises weighting at least one of the fraud risk score, the underwriting risk score and the property valuation risk score based on the level of risk associated therewith such that the risk score is based on the weights assigned thereto. In another embodiment, the step of converting comprises converting at least one of the fraud risk score, the underwriting risk score and the property valuation risk score such that all of the scores are compatible, and averaging the compatible scores.

The loan information includes insurance information related to at least one insurance claim being asserted against an insurance policy to which the loan is subject, such that the step of calculating a risk score comprises calculating a risk score for the claim based on a plurality of factors including at least one of a fraud risk factor, an underwriting risk factor, and a property valuation risk factor, whereby the risk score can be used by a loan service provider in deciding whether to allow or deny the claim.

The method may further comprise the step of interfacing at least one pricing scheme of a loan service provider such that a loan or insurance policy can be automatically priced based on the risk score calculated therefor.

BRIEF DESCRIPTION OF THE SEVERAL VIEWS OF THE DRAWINGS

The accompanying drawings, which are incorporated in and form a part of the specification, illustrate the embodiments of the present invention and together with the description, serve to explain the principles of the invention. In the drawings:

FIG. 3 shows one embodiment of an input screen display generated by the system and method of the present invention.

FIG. 5 shows one embodiment of a report generated by the system and method of the present invention.

DETAILED DESCRIPTION OF THE INVENTION

Figure 1:
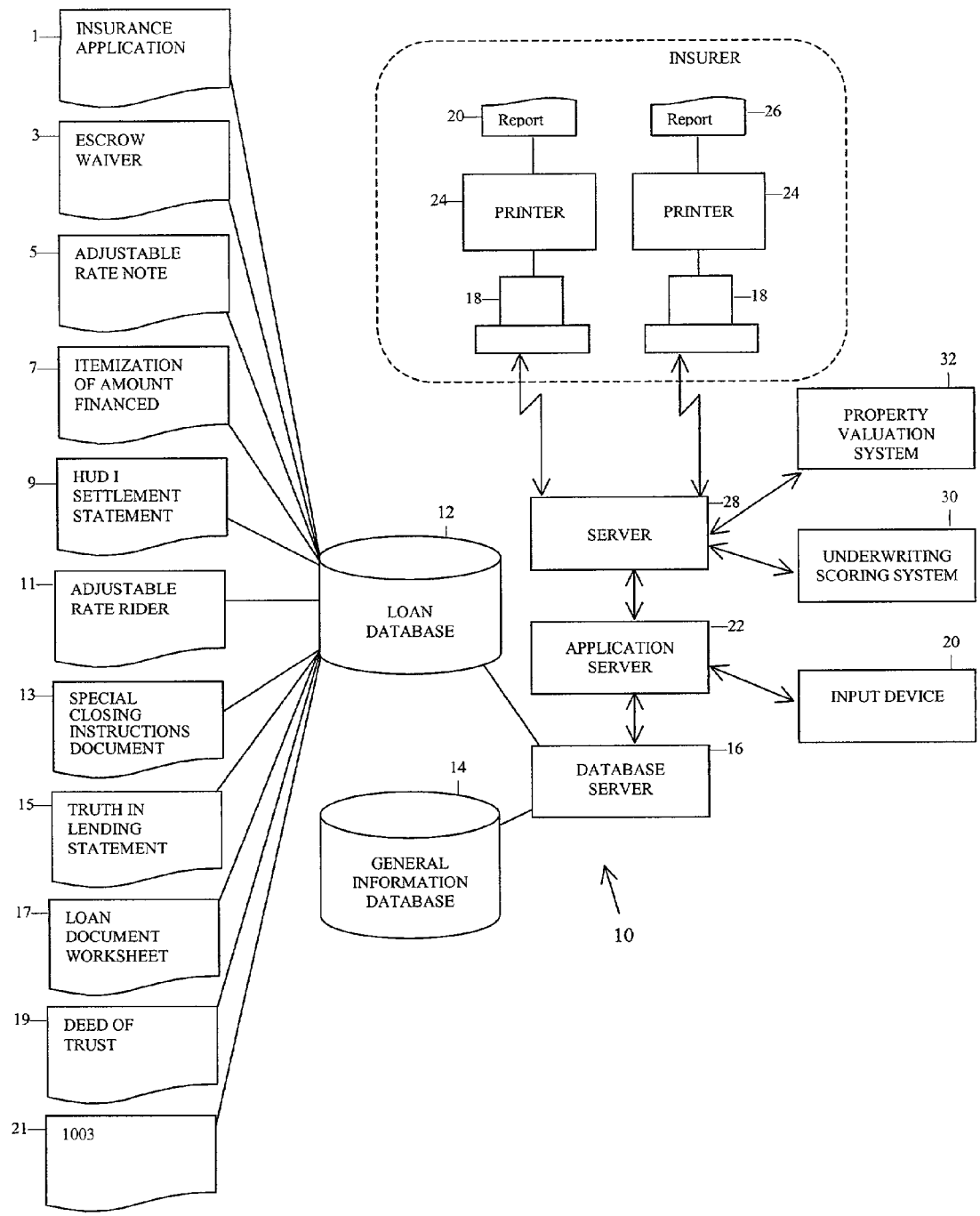
FIG. 1 is a block diagram of a loan risk assessment system in accordance with one embodiment of the present invention.

FIG. 1 shows a block diagram of a system 10 in accordance with one embodiment of the present invention; namely the assessment of risk associated with insuring a mortgage based on a plurality of risk factors including without limitation a fraud risk factor, an underwriting risk factor and a property valuation risk factor. While the system 10 will be described in connection with the insurance of a mortgage, it can be appreciated that the system 10 can be applied to the funding or insuring of any type of loan. The system 10 consists of a plurality of databases for storing a plurality of different types of information. In particular, a database 12 stores a variety of specific information related to the loan, including without limitation information about the borrower and the subject property. Such information may come from a variety of documents including without limitation an insurance application 1, an Escrow Waiver 3, an Adjustable Rate Note 5, an Itemization of Amount Financed 7, a U.S. Department of Housing and Urban Development (HUD) I Settlement statement 9, an Adjustable Rate Note 11, a Special Closing Instructions document 13, a Truth-in-Lending statement 15, a loan document worksheet 17, a Deed of Trust 19, and a residential loan application 21 (also known as a "1003"). To the extent the system 10 is also or alternatively being used to assess the risk associated with insuring a loan, the loan information may include information related to the insurance of the loan. Such information may come from the insurer and the insurance application.

A database 14 stores general information related to borrowers, lenders, insurers, properties and any other aspect of the loan. Borrower information may include personal information about the borrower such as his or her name, address, and Social Security number. Lender information may include the lender's name, address and lending history. Property information may include addresses and appraisal values. This general information can come internally from the operator of the system 10, and/or from one or more third party or external database sources. For example, property information could come from such third party sources as International Data Management Corporation (IDM), Data Quick and Management Risk Assessment Corporation (MRAC), and Accumail United States Postal Service National Database. Borrower and lender information could come from third party sources, such as Trans Union, Equifax, Lexis Nexis, Acxiom, Info USA and Dunn and Bradstreet.

The loan information and the general information are stored in a database server 16, which includes communication software for communicating with third party or external databases not stored therein. It can be appreciated, however, that the loan information and the general information could be each stored in a separate database server or stored in various combinations thereof as needed. In one embodiment, the server database 16 is a Dell Power-Edge 2400 running Sequel Server 2000 software in a Windows 2000 operating system environment. In a preferred embodiment, two database servers are provided for load balancing and redundancy.

Figure 3:
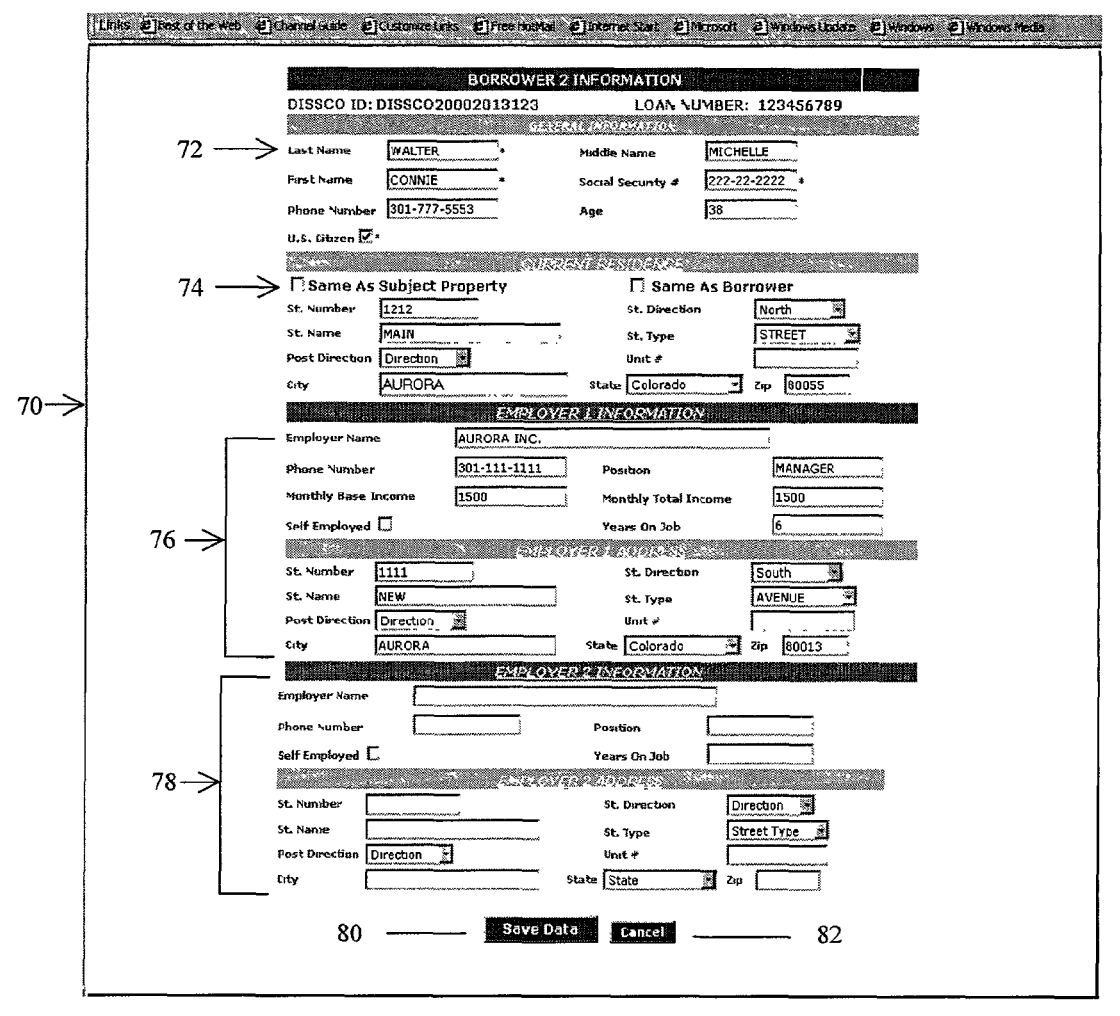

The loan information may be input into system 10 for storage in loan database 12 via input devices 18. While input devices 18 as shown are personal computers, they can be any type of device that allows the input of data. Specifically, the insurer logs on to system 10 through an input device 18, whereupon several screens such as screen 50 shown in FIG. 3, are displayed. Each screen 50 may include one or more fields in which the loan information can be input. For example, screen 50 includes a General Information section 52 in which general information about the borrower can be input, such as last name, middle name, first name, Social Security number, phone number, age and citizenship. Current residence section 54 allows the insurer to input information related to the borrower's current residence. Employer Information sections 56 and 58 allow the insurer to input information related to a borrower's current and previous employers. Once the information has been input, the insurer can save it by clicking on the "Save Data" button 60. If the insurer does not wish to save the information, he or she can simply click the "Cancel" button 62. Similar screens are displayed to the insurer until all of the necessary loan information has been input. Once input, the loan information can be downloaded to loan database 12.

Input devices 18 are shown as being located at the insurer's establishment such that the loan information is input directly by the insurer and then simply downloaded to database server 16 for storage in the loan database 12. The insurer may in turn use a document preparation company or rely on the lender to input and download some or all of the loan information directly for storage in loan database 12. Alternatively, the loan information can be sent to the operator of the system 10 to be input via one or more input devices 20 connected either directly or remotely to an application server 22. Such input devices 20 may then also be used to input any general information to be stored in general database 14. The loan information may be input to system 10 by a lender in the same manner as described above with respect to the insurer. One or more of the input devices 18 or 20 may be connected to a printer 24 for printing reports generated by the system 10.

Application server 22 is responsible for processing the loan information associated with each loan or insurance application to assess the level of risk associated with the funding and/or insuring of the loan, respectively. Application server 22 includes memory (not shown) for storing the program or programs necessary for assessing such risk as will be further discussed herein. Application server 22 interfaces with the input devices 18, underwriting scoring systems 30, and property valuation systems 32 through server 28. The connection between server 28 and input devices 18, underwriting scoring systems 30, and property valuation systems 32 can be via any communication network such as the telephone network, a satellite network, a cable network or any other communications network capable of transmitting information across it. Server 28 includes communication software to allow it to communicate with input devices 18, underwriting scoring systems 30, and property valuation systems 32. In one embodiment, application server 22 and server 28 are Dell Power-Edge 1550 servers running Microsoft Internet Information Services (IIS) Server v5.0 software under a Windows 2000 advanced server operating system. In a preferred embodiment, server 28 is a web server that allows system 10 to be implemented through a website accessible via the Internet. However, it can be appreciated that any type of server having the necessary processing capabilities and storage capacity may be used. In a preferred embodiment, application server 22 and server 28 are provided in duplicate for load balancing and redundancy.

The process of assessing the level of risk associated with insuring a loan will be described with reference to FIGS. 2, 4 and 5. For exemplary purposes, this process will be discussed in connection with a system 10 that is web-based and accessed by a mortgage insurer. It can be appreciated, however, that the system 10 need not be web-based to operate, and any loan service provider with authorized access to the system 10 and who desires the ability to automatically assess the risk associated with the funding and/or insuring of a loan may use the system 10.

Figure 2:
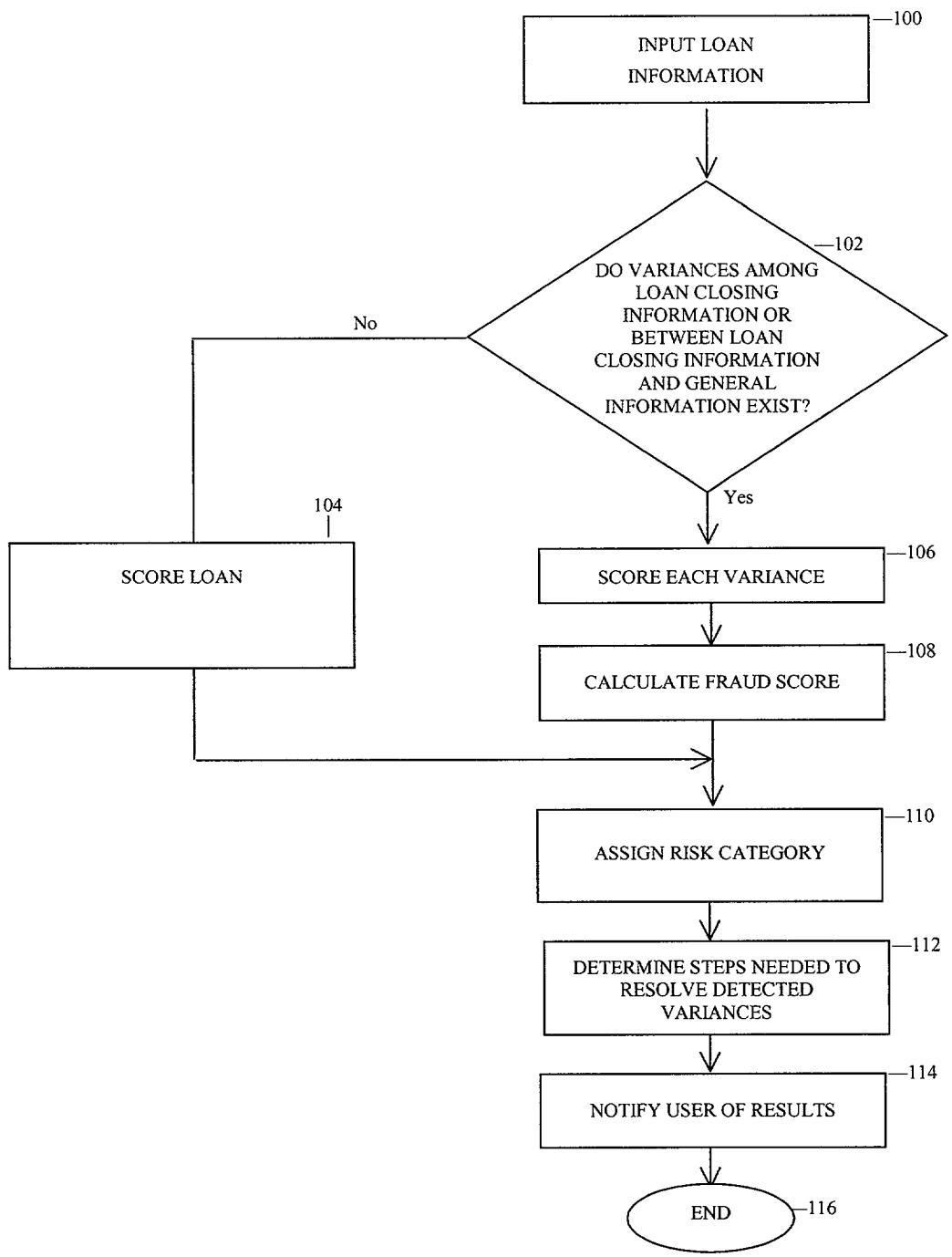
FIG. 2 is a flowchart illustrating one embodiment of the steps for assessing the risk associated with a loan based on fraud using the system of FIG. 1.

FIG. 2 illustrates the process of assessing the risk of insuring a mortgage based on the fraud risk factor. At 100, information about the loan requesting to be insured is input. At 102, application server 22 checks this loan information to determine if there are any variances or differences among the loan information stored in loan database 12 or between the loan information stored in loan database 12 and the general information stored in general information database 34. For example, in the case of falsified identity, the social security number provided is checked to see if it corresponds to someone who has died, if it has been reported stolen, if it was issued prior to the borrower's birth year, or it if does not match the borrower's age. If no variances are found, at 105 the system 10 scores the loan accordingly.

If one or more variances are found, at 106, the system 10 preferably scores each variance based on the degree thereof. In one embodiment, the score is a numeric value such that the higher the degree of variance, the lower the score. For example, a discrepancy in the borrower's address may be scored lower (i.e., worse) than a discrepancy in the employer's address. It can be appreciated, however, that a reverse scoring system could be used whereby a higher degree of variance results in a higher score. It can also be appreciated that any type of scoring system indicative of the severity of the risk associated with the detected variance, including a non-numeric one, could be used. For example, each detected variance can be assigned a specific weight or grade based on its severity. Likewise, the system 10 can calculate a fraud score (as discussed below) based on the type, number and severity of the detected variances rather than scoring each variance separately.

At 108, the system 10 calculates a fraud score based on the sum of the scores of each detected variance and at 110, assigns the loan a risk category based on the fraud score. In one embodiment, a total score ranging between 600 and 1000 results in a "Pass" score, a total score ranging between 401 and 599 results in a "High" score, and a total score ranging between 0 and 400 results in an "Investigate" score. A Pass score means that there were no or minimal variances detected in connection with the loan information and that therefore, there is no actual fraud detected in connection with this loan. A High score means that the variances detected indicate a potential for fraud and that therefore while there is a relatively low level of risk of insuring the loan vis-à-vis fraud, the insurer may nevertheless want to further scrutinize the loan information. An Investigate score means that there is some aspect of the loan that is potentially fraudulent, but a greater level of risk than in the case of a High score. Again, any type of scoring system indicative of the risk associated with the loan information at issue may be used.

At 112, the system 10 determines what step or steps are needed to resolve any detected variances, and at 114, the system 10 notifies the user of the results. FIG. 5 shows one embodiment of how system 10 may notify a user of its results. Specifically, a screen 70 is displayed to the user on his or her input device 18. In section 72, identifying information about the loan is displayed, such as the name of the borrower and the loan number. In section 74, more detailed loan information is provided, such as for example the loan amount, the purchase price and the estimated/appraised value. Section 76 provides information from the insurance application. Section 76 provides a summary of the results of the insurance application as processed by system 10. At 78, the total fraud score is displayed, and at 80, the risk category (i.e., Pass, High or Investigate) is identified.

In the case of an Investigate status, section 82 identifies each variance or transgression and at 84, provides a description of the variance. In the example shown, the first transgression indicates that the property value exceeds its expected range. The second transgression indicates that the effective date on the insurance application does not reflect the loan closing date. At 86, the system 10 identifies any action that can be taken to resolve the transgression. A section 88 is also preferably provided which allows any additional comments regarding the transgression, as well as a section 90 which allows the user to track the status of a transgression and if and when it has been resolved. Alternatively, in the case where the insurance application is not being processed in real-time, notification can be sent to the user via e-mail, facsimile, telephone or any other known notification method.

Figure 4:
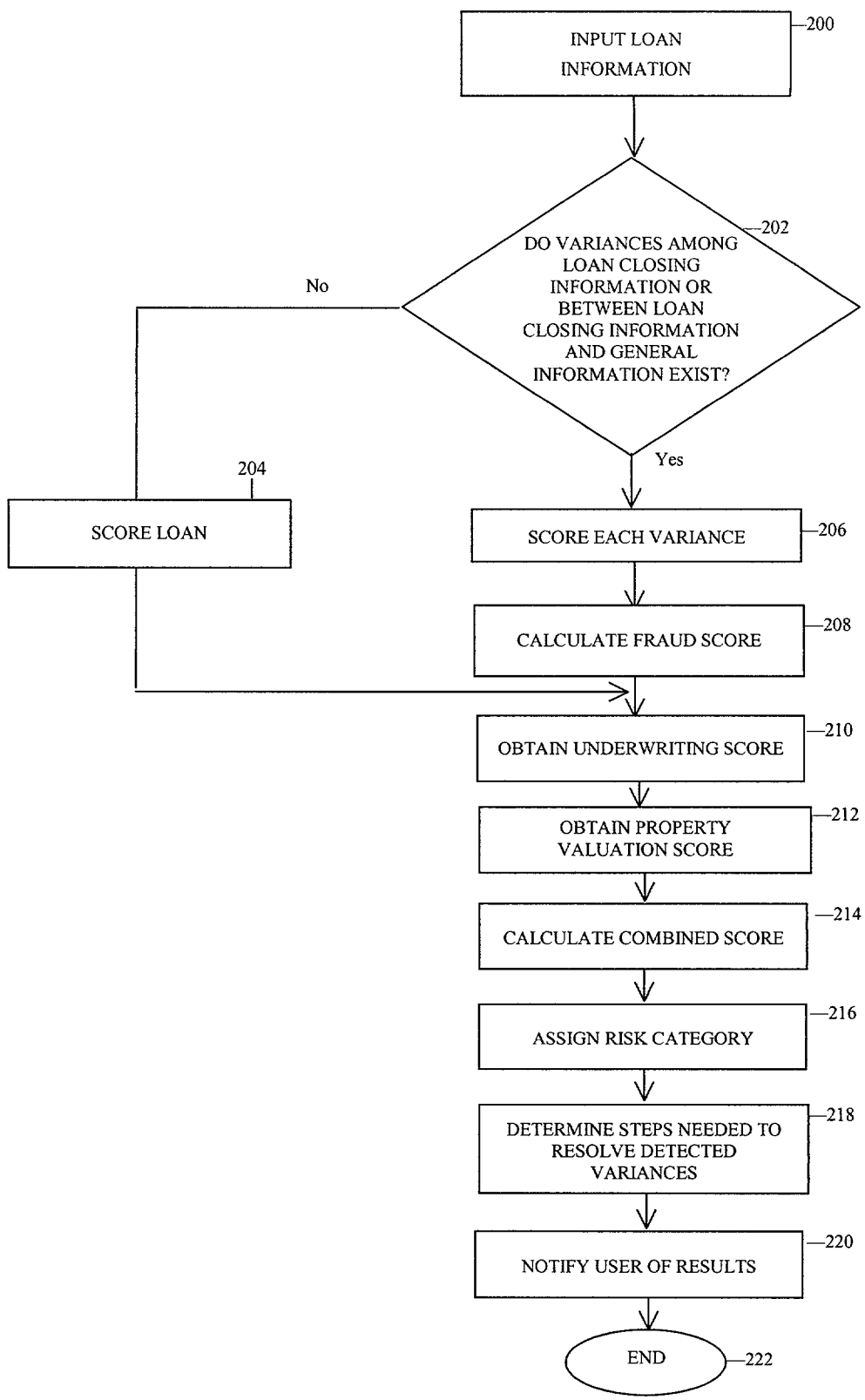
FIG. 4 is a flowchart illustrating one embodiment of the steps for assessing the risk associated with a loan based on a combination of fraud, underwriting and property valuation risk factors using the system of FIG. 1.

FIG. 4 illustrates the process of assessing the level of risk associated with insuring a loan vis-à-vis a combination of the fraud, underwriting and property value risk factors. In particular, at 200, information about the loan requesting to be insured is input into system 10. At 202, application server 22 checks this loan information to determine if there are any variances among the loan information stored in loan database 12 or between the loan information stored in loan database 12 and the general information stored in general database 34. If no variances are detected, at 204 the system 10 scores the loan. If one or more variances are detected, at 206, the system 10 scores each variance based on the degree thereof. As stated previously herein, any scoring mechanism may be used. At 208, the system 10 calculates a fraud score for each insurance application based on the sum of the scores of each detected variance. As previously mentioned, in the case where each detected variance is not individually scored, the fraud score is based on the number, type and severity of detected variances. At 210, the system 10 obtains an underwriting score from an underwriting scoring system 30. At 212, the system 10 obtains a property valuation score from a property valuation system 32. At 214, the system 10 calculates a combined score based on a combination of the fraud, underwriting and property valuation scores.

Step 214 is performed by combining the three scores based on each individual score and the level of risk associated therewith. For discussion purposes only, it will be assumed that the fraud and property valuation scores are Pass, High or Investigate, and the underwriting score is one generated from a Fannie Mae underwriting system which includes the following: approve/eligible, approve/ineligible, refer/eligible, refer/ineligible, refer with caution or out of scope (i.e., reject). It will also be assumed that the combined score calculated by the system 10 will be the same as that used by the underwriting scoring system.

In one embodiment, the incompatible scores are "converted" by system 10 by assigning a weight to each individual score vis-à-vis the other scores and its corresponding level of risk. For example, a fraud score of Investigate will always be weighted such that the combined score will always be an Out of Scope score regardless of the underwriting and property valuation scores. Likewise, a property valuation score of Investigate will also always be weighted such that the combined score will always be an Out of Scope score regardless of the fraud and property valuation scores. In the case where there are no Investigate scores but at least one of the fraud or property valuation scores is High, the combined score will be Refer with Caution. In general, the less risk associated with each score, the better the combined score.

Alternatively, one or more of the scores are converted into a score that is compatible with the other. For example, the numeric fraud score can be used as the scoring system for the combined score and the underwriting and property valuation scores can be converted to a similar numeric value representative thereof. One advantage of using the numeric scores is that the level of risk is more specific. For instance, while a score of 401 and a score of 599 would both be High, the score 401 represents a higher risk than the score 599. Under such a system, an approve/eligible score will have a higher (i.e., better) score than a refer with caution score. Each score can then be added together and an average score computed. It can be appreciated, that any scoring system can be used for the combined score and that any fraud, underwriting and/or property valuation scores not compatible therewith would need to be "converted" by system 10 before the combined score could be calculated.

At 216, the system 10 assigns a risk category to the loan based on the combined score. In a preferred embodiment, at 218, the system 10 determines the steps needed to resolve any detected variances. At 220, the system 10 notifies the user of the results, and at 222 the process ends.

While the system and method have been described with respect to the assessment of risk based on the fraud score by itself, and a combination of the fraud, underwriting and property valuation scores, it can be appreciated that the system and method of the present invention can incorporate any combination of these scores (i.e., fraud score plus underwriting score, fraud score plus property valuation score, or underwriting plus property valuation score). With such a system and method, a loan service provider can better assess the level of risk involved with funding or insuring the loan through one source.

The system and method of the present invention can also be used to assist insurers with the processing of claims associated with their insurance policies. The system is the same in structure as system 10 shown in FIG. 1, except that the loan database 12 includes information input by the insurer related to the claims and corresponding insurance policies at issue and each insured's payment history for the policy. An insurer can determine whether to accept or deny a claim depending on at least one of a fraud risk score, and underwriting risk score, a property valuation risk score or a combined score calculated by the system for the claim at issue.

Finally, the system and method of the present invention can also be used as an automatic risk-pricing tool to assist loan service providers with the pricing of loans and insurance policies, respectively. Specifically, since the combined score is representative of the risk associated with the loan or insurance application, it can be used to price the loan or insurance policy covering it. In particular, server 28 of FIG. 1 interfaces the lender's or insurer's pricing scheme (not shown), such that the loan or insurance policy at issue can be automatically priced out based on the combined score calculated therefor.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

We claim:

1. An automated loan risk assessment system, comprising:
   means for receiving information about a loan;
   means for detecting a plurality of variances associated with the information about the loan;
   means for scoring each variance detected by the means for detecting the plurality of variances;
   means for calculating a numeric risk score for the loan based on a plurality of risk factors including at least two of a fraud risk factor, an underwriting risk factor and a property valuation risk factor, said means for calculating combines each score generated by the means for scoring each variance to calculate the numeric risk score;
   means for assigning a risk category to the loan based on the numeric risk score; and
   means for generating a computer screen for displaying the numeric risk score and the risk category to a user.

2. The automated loan risk assessment system of claim 1, wherein the risk calculation means comprises:
   means for calculating a fraud risk score;
   means for calculating an underwriting risk score; and
   means for calculating a property valuation score, wherein the numeric risk score for the loan is based on at least two of the fraud risk score, the underwriting risk score and the property valuation risk score.

3. The automated loan risk assessment system of claim 2, wherein the fraud risk score calculation means comprises:
   means for storing general information about borrowers and properties; and
   means for detecting one or more variances among the loan information or between the loan information and the general information, each variance having a certain degree, such that the fraud risk score is based on the detected variances and the degrees thereof.

4. The automated loan risk assessment system of claim 3, further comprising means for calculating a variance score for each detected variance based on the degree thereof, wherein the fraud risk score represents the sum of the variance scores.

5. The automated loan risk assessment system of claim 3, further comprising means for determining one or more steps needed to resolve the plurality of variances.

6. The automated loan risk assessment system of claim 3, further comprising means for tracking the status of the plurality of variances.

7. The automated loan risk assessment system of claim 2, wherein the underwriting risk score calculation means comprises means for obtaining the underwriting risk score from an underwriting risk score provider, and wherein the property valuation risk score calculation means comprises means for obtaining a property valuation risk score from a property valuation score provider.

8. The automated loan risk assessment system of claim 2, further comprising means for converting at least one of the fraud risk score, the underwriting risk score and the property valuation risk score.

9. The automated loan risk assessment system of claim 8, wherein the means for converting comprises means for weighting at least one of the fraud risk score, the underwriting risk score and the property valuation risk score based on a level of risk associated therewith such that the risk score is based on the weights assigned thereto.

10. The automated loan risk assessment system of claim 8, wherein the means for converting comprises converting at least one of the fraud risk score, the underwriting risk score and the property valuation risk score such that all of the scores are compatible, and wherein the numeric risk score represents an average of the compatible scores.

11. The automated loan risk assessment system of claim 1, wherein the loan information includes insurance information related to at least one insurance claim being asserted against an insurance policy to which a loan is subject, and wherein the means for calculating a numeric risk score comprises means for calculating a numeric risk score for the claim based on a plurality of risk factors including at least one of a fraud risk factor, an underwriting risk factor and a property valuation risk factor.

12. The automated loan risk assessment system of claim 1, further comprising means for interfacing at least one pricing scheme of a loan service provider such that a loan or an insurance policy for a loan is automatically priced based on the numeric risk score calculated therefor.

13. The automated loan risk assessment system of claim 1, wherein the numeric risk score is based on a combination of the fraud risk score factor, the underwriting risk factor and the property valuation risk factor.

14. An automated loan risk assessment system, comprising:
    a mechanism configured to receive information about a loan;
    a mechanism configured to detect a plurality of variances associated with the information about the loan;
    a mechanism configured to calculate a numeric risk score for the loan based on a plurality of risk factors including at least two of a fraud risk factor, an underwriting risk factor and a property valuation risk factor, said mechanism configured to calculate the numeric risk score by combining each score generated by the mechanism configured to score each variance to calculate the numeric risk score;
    a mechanism for assigning a risk category to the loan based on the numeric risk score; and
    a mechanism for generating a computer screen for displaying the numeric risk score and the risk category to a user.

15. The automated loan risk assessment system of claim 14, wherein the risk calculation mechanism comprises:

a mechanism configured to calculate a fraud risk score;
a mechanism configured to calculate an underwriting risk score; and
a mechanism configured to calculate a property valuation score, wherein the numeric risk score for the loan is based on at least two of the fraud risk score, the underwriting risk score and the property valuation risk score.

16. The automated loan risk assessment system of claim 15, wherein the fraud risk score calculation mechanism comprises:
a mechanism configured to store general information about borrowers and properties; and
a mechanism configured to detect one or more variances among the loan information or between the loan information and the general information, each variance having a certain degree, such that the fraud risk score is based on the detected variances and the degrees thereof.

17. The automated loan risk assessment system of claim 16, further comprising a mechanism configured to calculate a variance score for each detected variance based on the degree thereof, wherein the fraud risk score represents the sum of the variance scores.

18. The automated loan risk assessment system of claim 16, further comprising a mechanism configured to determine one or more steps needed to resolve the one or more detected variances.

19. The automated loan risk assessment system of claim 16, further comprising means for tracking the status of the one or more detected variances.

20. The automated loan risk assessment system of claim 15, wherein the underwriting risk score calculation mechanism comprises a mechanism configured to obtain the underwriting risk score from an underwriting risk score provider, and wherein the property valuation risk score calculation mechanism comprises a mechanism configured to obtain a property valuation risk score from a property valuation score provider.

21. The automated loan risk assessment system of claim 15, further comprising a mechanism configured to convert at least one of the fraud risk score, the underwriting risk score and the property valuation risk score.

22. The automated loan risk assessment system of claim 21, wherein the converting mechanism comprises a mechanism configured to weight at least one of the fraud risk score, the underwriting risk score and the property valuation risk score based on a level of risk associated therewith such that the risk score is based on the weights assigned thereto.

23. The automated loan risk assessment system of claim 21, wherein the converting mechanism is configured to convert at least one of the fraud risk score, the underwriting score and the property valuation risk score such that all of the scores are compatible, and wherein the numeric risk score represents an average of the compatible scores.

24. The automated loan risk assessment system of claim 14, wherein the loan information includes insurance information related to at least one insurance claim being asserted against an insurance policy to which a loan is subject, and wherein the mechanism for calculating a the numeric risk score comprises a mechanism configured to calculate a numeric risk score for the claim based on a plurality of risk factors including at least one of a fraud risk factor, an underwriting risk factor and a property valuation risk factor.

25. The automated loan risk assessment system of claim 14, further comprising a mechanism configured to interface at least one pricing scheme of a loan service provider such that a loan or an insurance policy for a loan is automatically priced based on the numeric risk score calculated therefor.

26. The automated loan risk assessment system of claim 14, wherein the numeric risk score is based on a combination of the fraud risk score, the underwriting risk score and the property valuation risk score.

27. A non-transitory computer-readable medium whose contents cause a computer system to assess the risk associated with funding or insuring a loan by performing the steps of:
receiving information about a loan;
detecting a plurality of variances associated with the information about the loan;
scoring each variance detected by the computer system;
calculating at the computer system a numeric risk score for the loan based on a plurality of risk factors including at least two of a fraud risk factor, a credit risk factor and a property valuation risk factor by combining each score for each variance detected by the computer system to calculate the numeric risk score;
assigning at the computer system a risk category to the loan based on the numeric risk score; and
displaying a computer screen to a user which includes the numeric risk score and the risk category.

28. The computer-readable medium of claim 27, wherein the step of calculating the numeric risk score further comprises the steps of:
calculating a fraud risk score;
calculating an underwriting risk score; and
calculating a property valuation score, wherein the numeric risk score for the loan is based on the fraud risk score, the underwriting risk score and the property valuation risk score.

29. The computer-readable medium of claim 28, wherein the step of calculating the fraud risk score comprises: storing general information about borrowers and properties; and detecting one or more variances among the loan information or between the loan information and the general information, each variance having a certain degree, such that the fraud risk score is based on the detected variances and the degrees thereof.

30. The computer-readable medium of claim 29, further comprising the step of calculating a variance score for each detected variance based on the degree thereof, wherein the fraud risk score represents the sum of the variance scores.

31. The computer-readable medium of claim 29, further comprising the step of determining one or more steps needed to resolve the plurality of variances.

32. The computer-readable medium of claim 29, further comprising the step of tracking the status of the plurality of variances.

33. The computer-readable medium of claim 28, wherein the step of calculating the underwriting risk score comprises obtaining the underwriting risk score from an underwriting risk score provider, and wherein the step of calculating the property valuation risk score comprises obtaining a property valuation risk score from a property valuation score provider.

34. The computer-readable medium of claim 28, further comprising the step of converting at least one of the fraud risk score, the underwriting risk score and the property valuation risk score.

35. The computer-readable medium of claim 34, wherein the step of converting comprises weighting at least one of the fraud risk score, the underwriting risk score and the property valuation risk score based on a level or risk associated therewith such that the numeric risk score is based on the weights assigned thereto.

36. The computer-readable medium of claim 34, wherein the step of converting comprises converting at least one of the fraud risk score, the underwriting risk score and the property valuation risk score such that all of the scores are compatible, and averaging the compatible scores.

37. The computer-readable medium of claim 27, wherein the loan information includes insurance information related to at least one insurance claim being asserted against an insurance policy to which a loan is subject, and wherein the medium further comprises the step of calculating a numeric risk score for the claim based on a plurality of risk factors including at least one of a fraud risk factor, an underwriting risk factor and a property valuation risk factor.

38. The computer-readable medium of claim 27, further comprising the step of interfacing at least one pricing scheme of a loan service provider such that a loan or an insurance policy is automatically priced based on the numeric risk score calculated therefor.

39. The computer-readable medium of claim 27, wherein the numeric risk score is based on a combination of the fraud risk score, the underwriting risk score and the property valuation risk score.

40. A computer-implemented method of assessing the risk associated with the funding or insuring of a loan, comprising:
   receiving information about a loan at a computer system;
   detecting using the computer system a plurality of variances associated with the information about the loan;
   scoring each variance detected by the computer system;
   calculating at a computer system a numeric risk score for the loan based on a plurality of risk factors including at least two of a fraud risk factor, an underwriting risk factor and a property valuation risk factor by combining each score for each variance detected by the computer system to calculate the numeric risk score;
   assigning at the computer system a risk category to the loan based on the numeric risk score; and
   displaying a computer screen to a user which includes the numeric risk score and the risk category.

41. The computer-implemented method of claim 40, wherein the step of calculating the numeric risk score further comprises the steps of:
   calculating a fraud risk score;
   calculating an underwriting risk score; and
   calculating a property valuation score, wherein the numeric risk score for the loan is based on the fraud risk score, the underwriting risk score and the property valuation risk score.

42. The computer-implemented method of claim 41, wherein the step of calculating the fraud risk score comprises:
   storing general information about borrowers and properties; and
   detecting one or more variances among the loan information or between the loan information and the general information, each variance having a certain degree, such that the fraud risk score is based on the detected variances and the degrees thereof.

43. The computer-implemented method of claim 42, further comprising the step of calculating a variance score for each detected variance based on the degree thereof, wherein the fraud risk score represents the sum of the variance scores.

44. The computer-implemented method of claim 42, further comprising the step of determining one or more steps needed to resolve the plurality of variances.

45. The computer-implemented method of claim 42, further comprising the step of tracking the status of the plurality of variances.

46. The computer-implemented method of claim 41, wherein the step of calculating the underwriting risk score comprises obtaining a credit risk score from a credit risk score provider, and wherein the step of calculating the property valuation risk score comprises obtaining a property valuation risk score from a property valuation score provider.

47. The computer-implemented method of claim 41, further comprising the step of converting at least one of the fraud risk score, the underwriting risk score and the property valuation risk score.

48. The computer-implemented method of claim 47, wherein the step of converting comprises weighting at least one of the fraud risk score, the underwriting risk score and the property valuation risk score based on a level of risk associated therewith such that the risk score is based on the weights assigned thereto.

49. The computer-implemented method of claim 47, wherein the step of converting comprises converting at least one of the fraud risk score, the underwriting risk score and the property valuation risk score such that all of the scores are compatible, and averaging the compatible scores.

50. The computer-implemented method of claim 40, wherein the loan information includes insurance information related to at least one insurance claim being asserted against an insurance policy to which the loan is subject, and wherein the step of calculating a numeric risk score comprises calculating a numeric risk score for the claim based on a plurality of factors including at least one of a fraud risk factor, an underwriting risk factor, and a property valuation risk factor.

51. The computer-implemented method of claim 41, further comprising the step of interfacing at least one pricing scheme of a loan service provider such that a loan or insurance policy is automatically priced based on the numeric risk score calculated therefor.

52. The computer-implemented method of claim 41, wherein the numeric risk score is based on a combination of the fraud risk score, the underwriting risk score, and the property valuation risk score.

* * * * *